(12) United States Patent
Tsabari (10) Patent No.: US 12,017,164 B2
(45) Date of Patent: Jun. 25, 2024

(54) WATER FILTER WITH SELF-RINSING CAPABILITY

(71) Applicant: Yigal Tsabari, Tslafon (IL)

(72) Inventor: Yigal Tsabari, Tslafon (IL)

( * ) Notice: Subject to any disclaimer, the term of this patent is extended or adjusted under 35 U.S.C. 154(b) by 73 days.

(21) Appl. No.: 17/838,315

(22) Filed: Jun. 13, 2022

(65) Prior Publication Data
US 2023/0001332 A1    Jan. 5, 2023

(51) Int. Cl.
*B01D 29/00* (2006.01)
*B01D 29/23* (2006.01)
*B01D 29/68* (2006.01)
*B01D 35/30* (2006.01)

(52) U.S. Cl.
CPC ............ *B01D 29/68* (2013.01); *B01D 29/23* (2013.01); *B01D 35/30* (2013.01); *B01D 2201/0415* (2013.01); *B01D 2201/084* (2013.01); *B01D 2201/167* (2013.01); *B01D 2201/287* (2013.01); *B01D 2201/302* (2013.01); *B01D 2201/325* (2013.01); *B01D 2201/4092* (2013.01)

(58) Field of Classification Search
CPC ........ B01D 29/68; B01D 29/23; B01D 35/30; B01D 2201/0415; B01D 2201/084; B01D 2201/167; B01D 2201/287; B01D 2201/302; B01D 2201/325; B01D 2201/4092; B01D 35/16; B01D 29/117; B01D 29/35; B01D 29/356; B01D 29/6415; B01D 29/6446
USPC ........ 210/411, 455, 440–446, 106, 108, 248, 210/275, 333.01, 425, 427, 499
See application file for complete search history.

(56) References Cited

U.S. PATENT DOCUMENTS

| | | | |
|---|---|---|---|
| 2004/0200770 A1* | 10/2004 | Clary | B01D 35/157 210/402 |
| 2009/0101595 A1* | 4/2009 | Allott | B01D 35/153 210/248 |

* cited by examiner

*Primary Examiner* — Madeline Gonzalez (57) ABSTRACT

Water filter with self-rinsing capability that includes filter housing, hollow cartridge core, and mesh filter. The filter housing includes a hollow housing with top and drain openings, a top cover with inlet and outlet ports, a one-way pressure valve, and a drain tap that includes a rod, an opening and closing knob that is connected to the rod, and an opening and closing barrier with passageway that is connected to the rod. The cartridge comprises of a tube with inlet and outlet passageways, and spray pipes with spray nozzles, and enables water to flows from the tube into the spray pipes and outside into the filter housing through the nozzles. The mesh filter has a shape of a hollow cylinder that is worn on the tube in a gap between the tube and the spray pipes.

6 Claims, 8 Drawing Sheets

WATER FILTER WITH SELF-RINSING CAPABILITY

TECHNICAL FIELD

The present invention refers to a water filter with self-rinsing capability that enables a self-rising of its mesh filter.

BACKGROUND ART

There are many types of water filters with mesh filters that are needed to be washed from time to time from the dirt that has accumulated on them. Usually, the user opens the filter housing of the water filter, takes out the mesh filter, rinses it with a stream of water (in the opposite direction of the water direction that passes through it while inside the filter housing), and returns it back to the filter housing. The present invention discloses a water filter with self-rinsing capability that enables a self-rinsing of its mesh filter while it is inside.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

Figure 1A:
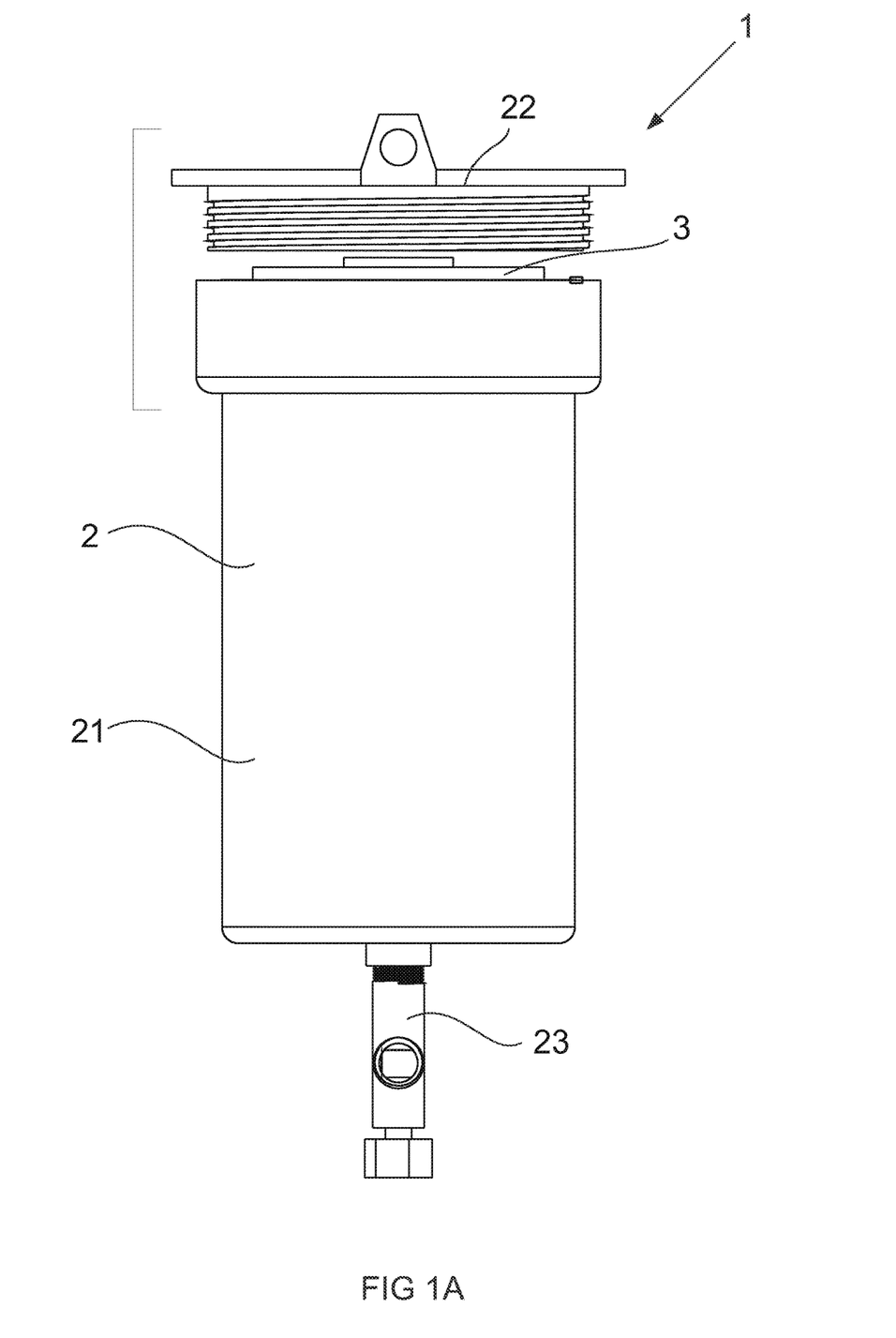
FIGS. 1A and 1B depict the water filter (1) in a working mode and in a self-rising mode respectively.
Figure 1B:
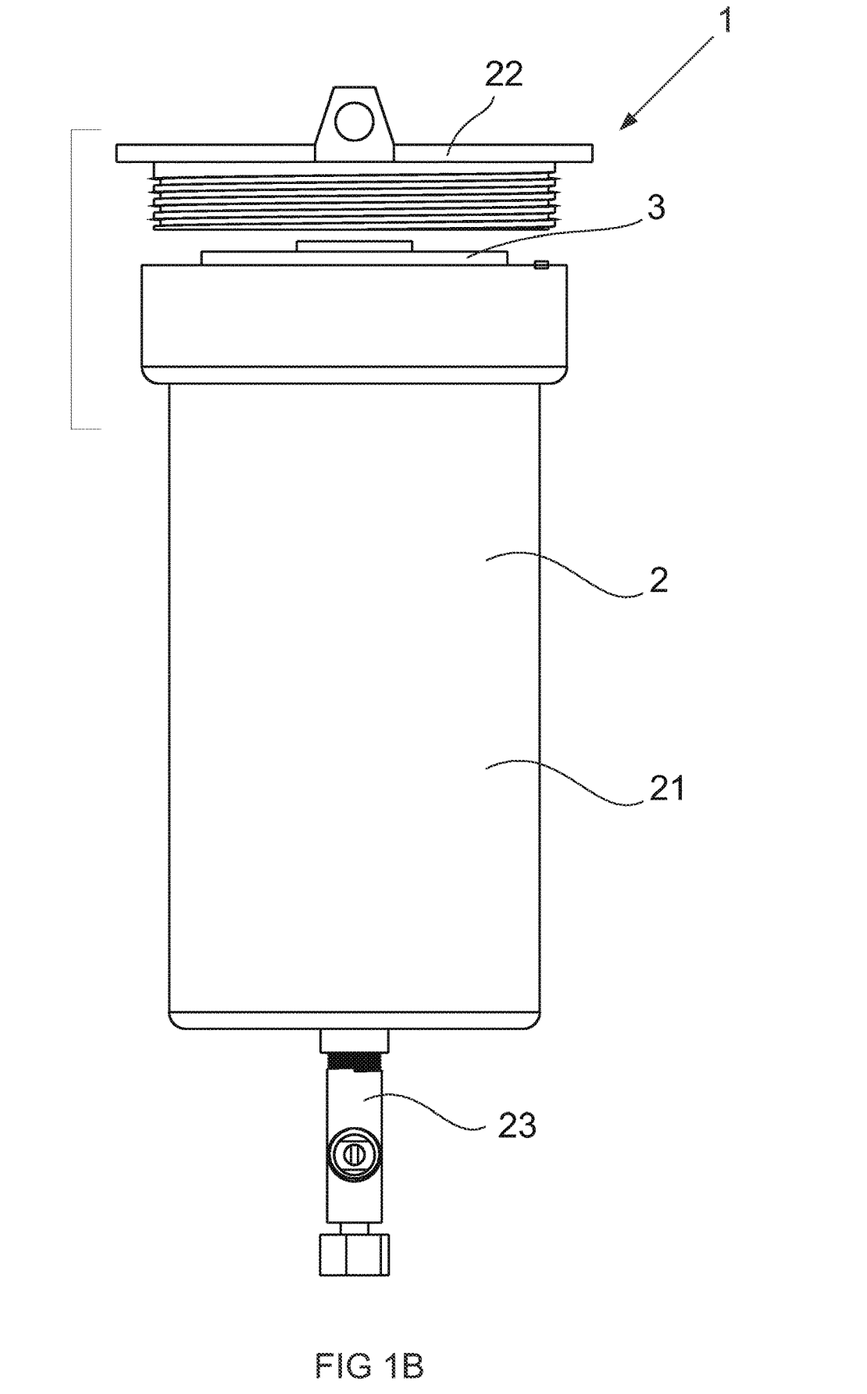

The main object of the present invention is to provide a water filter (1) with self-rinsing capability that enables a self-rinsing of its mesh filter. The water filter (1) includes a filter housing (2), a hollow cartridge core (3), and a mesh filter (4). The water filter (1) can be in a working mode, in which the water flows through the water filter from its inlet port to its outlet port to the destination, and in a self-rising mode, in which the water flows through the water filter from the inlet port and then outside through a drain tap. FIGS. 1A and 1B depict the water filter (1) in a working mode and in a self-rising mode respectively.

The filter housing (2) includes a hollow housing (21), a top cover (22), and a drain tap (23). The hollow housing (21) has a top opening (211) and a drain opening (212) preferably at its bottom part (213). The top cover (22) has an inlet port (221) and an outlet port (222) and is designed to close the top opening of the hollow housing from above possibly by threading. The top cover (22) also has a one-way pressure valve (223) that is designed to enable air to enter into the water filter in the self-rising mode and disable that in the working mode. The drain tap (23) includes a rod (231), an opening and closing knob (232) that is connected to a first end (2311) of the rod, and an opening and closing barrier (233) that is connected to a second end (2312) of the rod. The barrier (233) has a passageway (2331) for water flow.

The hollow cartridge core (3) comprises of a hollow tube (31) with a water inlet opening (32) and a water outlet passageway (33). The hollow cartridge core (3) also includes several spray pipes (34), preferably four, that each of which includes several spray nozzles (341), preferably three, as depicted in the drawings. The hollow cartridge core (3) is designed in a way that enables water to flows from the hollow tube (31) into the spray pipes (34) and then outside into the filter housing through the spray nozzles (341). The sprays pipes (34) are substantially parallel to at least a part (311) of the hollow tube (31) as illustrated for example in the drawings. The hollow cartridge core (3) is essentially designed to contain siliphos pellets for water treatment. It is possible to place a protecting mesh filter on the inlet openings of the spray pipes so that the spray nozzles will not be blocked by dirt.

Figure 2:
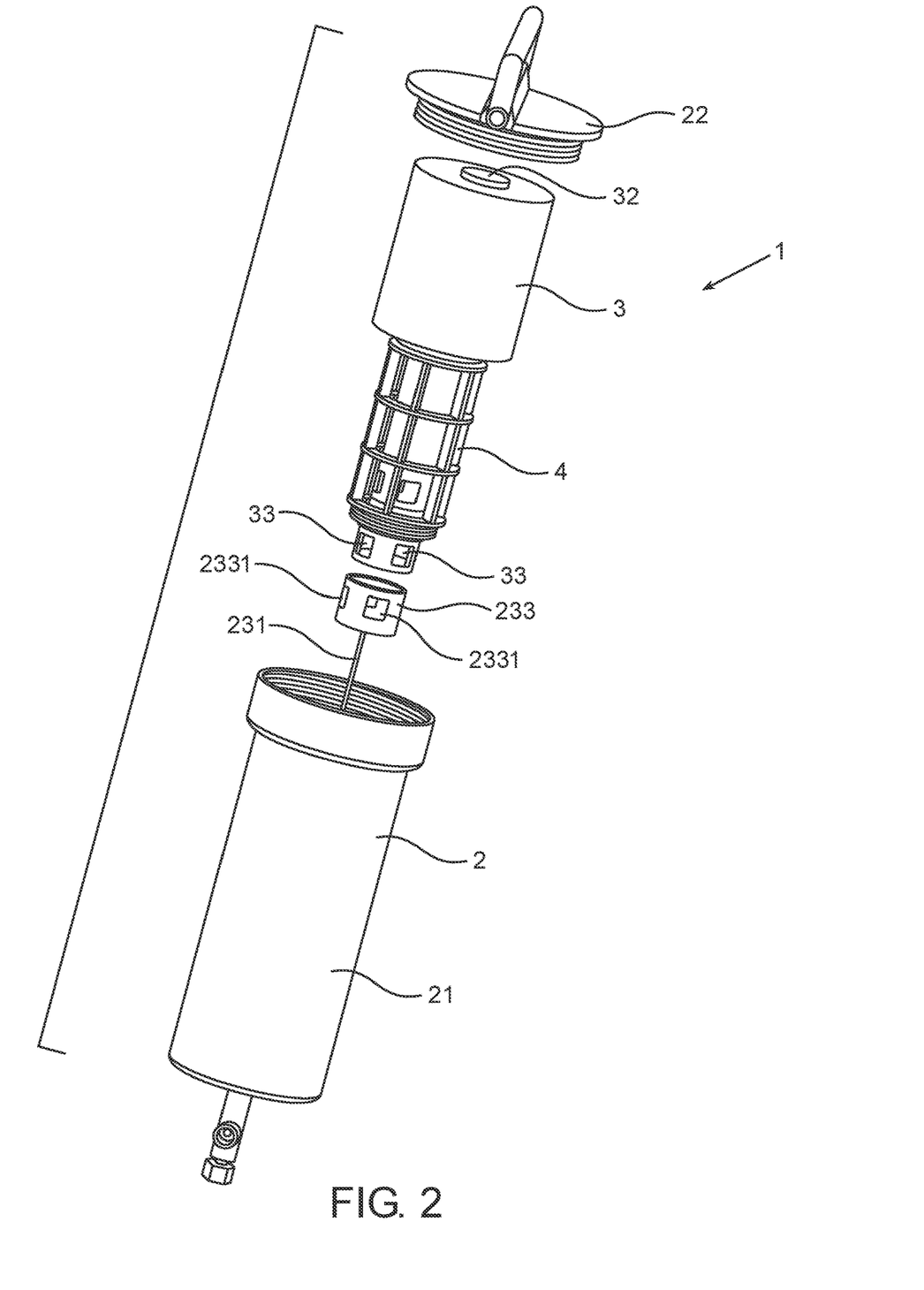
FIG. 2 is an exploded depiction of the water filter (1).
Figure 3:
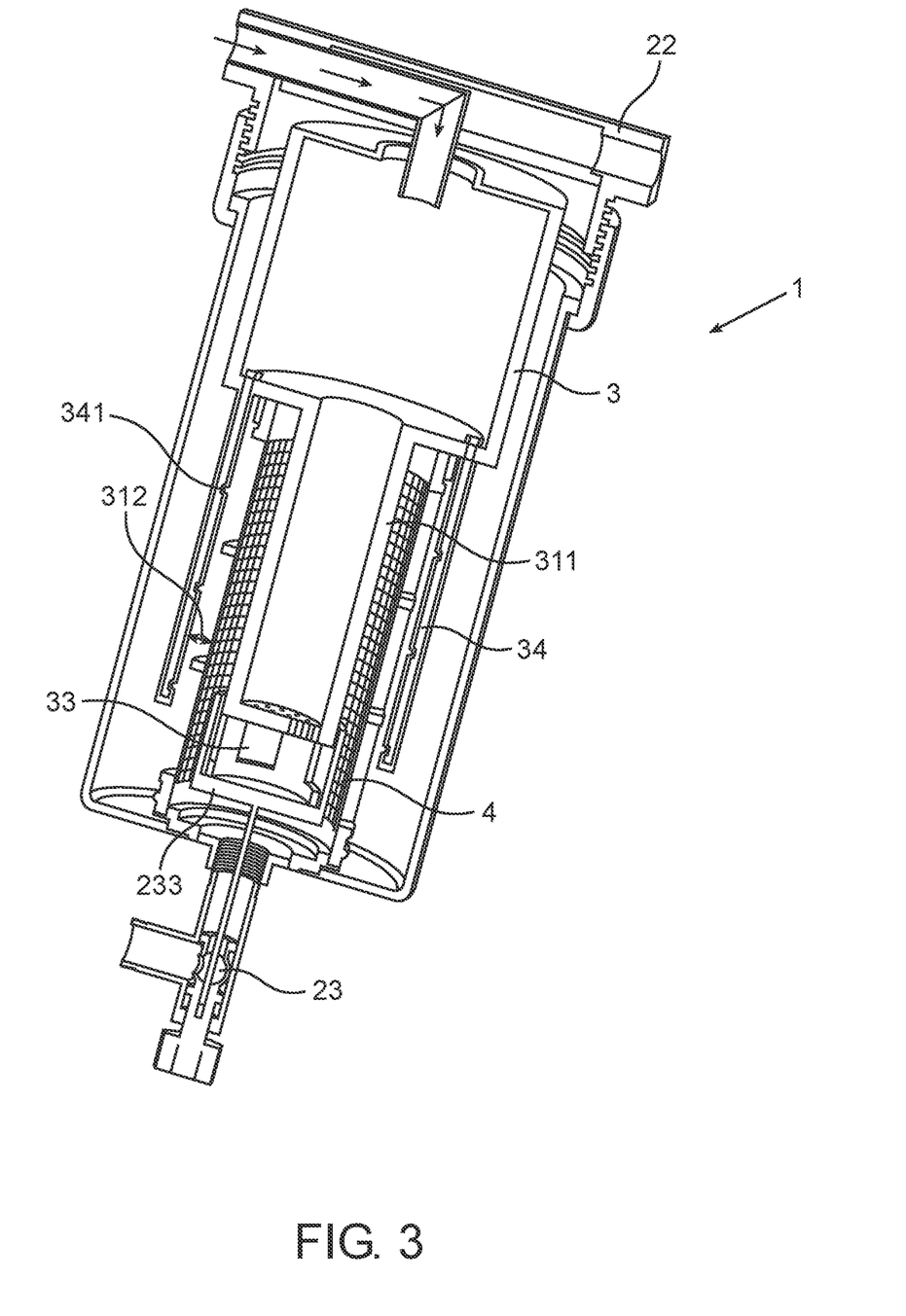
FIG. 3 is a cross sectional view of the water filter (1).

The mesh filter (4) is in a form of a hollow cylinder with a top and a bottom openings that is designed to be worn on the at least a part (311) of the hollow tube (31) inside a gap (312) that exists between the at least a part (311) of the hollow tube and the spray pipes (34), as illustrated for example in the drawings. FIG. 2 is an exploded depiction of the water filter (1) (without the spray pipes) and FIG. 3 is a cross sectional view of the water filter (1).

Figure 4A:
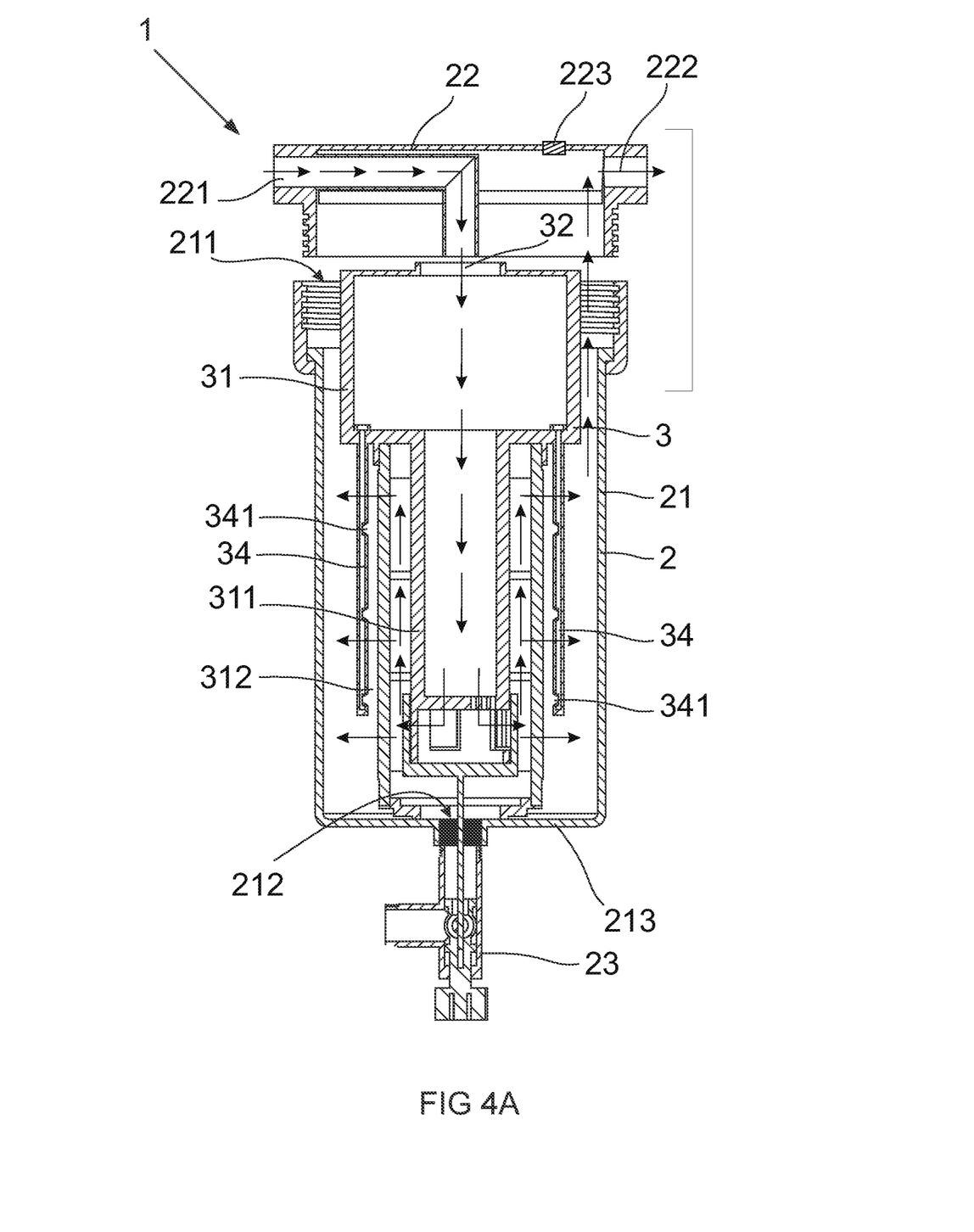
FIG. 4A is a cross sectional depiction of the water filter (1) in working mode.
Figure 4B:
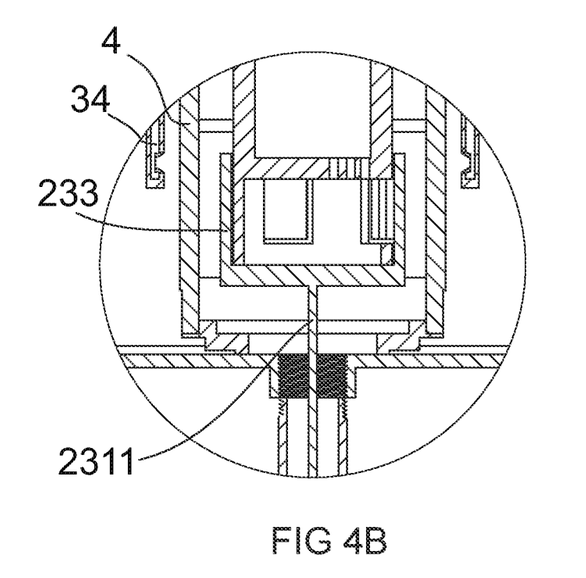
FIG. 4B is a cross sectional depiction of the barrier part in working mode.
Figure 4C:
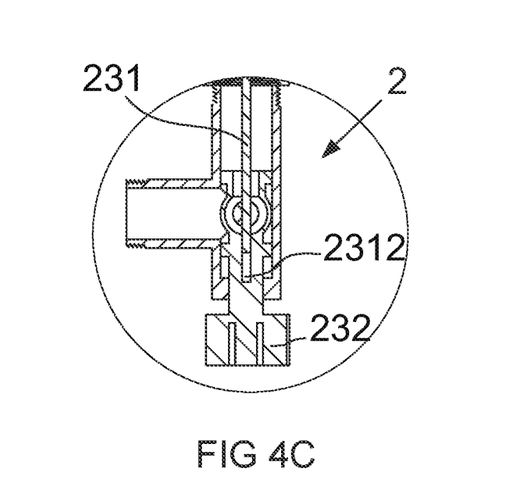
FIG. 4C is a cross sectional depiction of the drain tap part in working mode.

The water path inside the water filter in the working mode: the water flows from the inlet port (221) through the cover (22) and then through the water inlet opening (32) into the hollow tube (31), and then through the water outlet passageway (33) and through the passageway (2331) of the barrier (233) into the gap (312) and then through the mesh filter (4) into the hollow housing (21) and then outside to destination through the outlet port (222). FIG. 4A is a cross sectional depiction of the water filter (1), FIG. 4B is a cross sectional depiction of the barrier part (233), and FIG. 4C is a cross sectional depiction of the drain tap part (23), in the working mode.

Figure 5A:
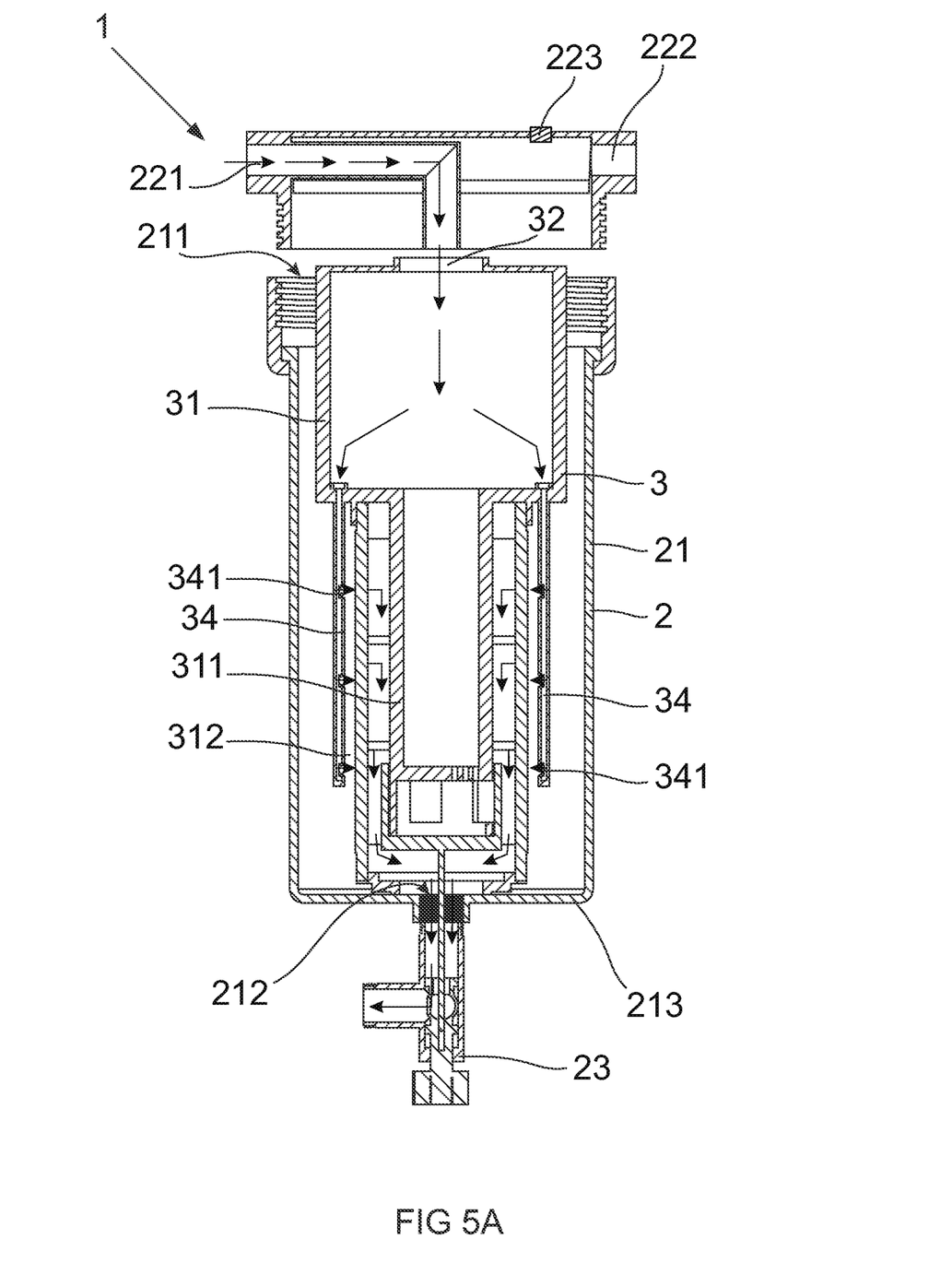
FIG. 5A is a cross sectional depiction of the water filter (1) in self-rising mode.
Figure 5B:
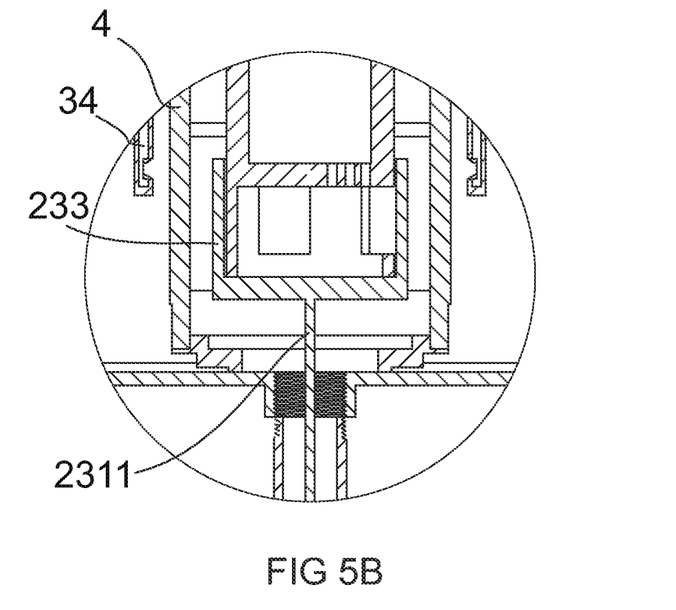
FIG. 5B is a cross sectional depiction of the barrier part in self-rising mode.
Figure 5C:
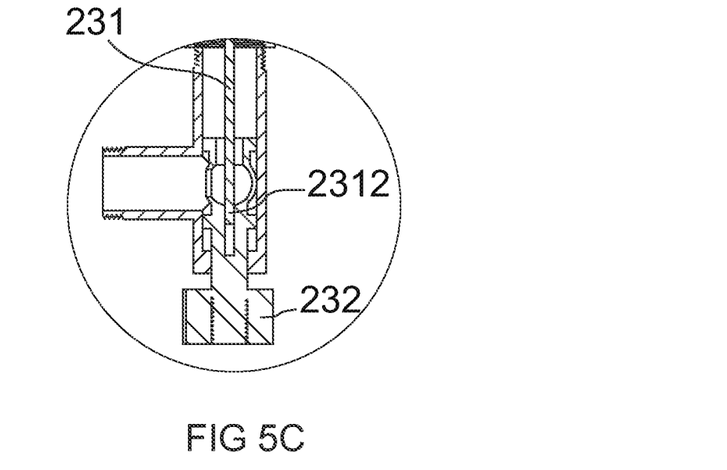
FIG. 5C is a cross sectional depiction of the drain tap part in self-rising mode.

The water path inside the water filter in the self-rising mode: the water flows from the inlet port (221) through the cover (23) and then through the water inlet opening (32) into the hollow tube (31), and then through the several spray pipes (34), through the spray nozzles (341) and then through the mesh filter (4) into the gap (312) and then outside through the drain opening (212) and the drain tap (23). FIG. 5A is a cross sectional depiction of the water filter (1), FIG. 5B is a cross sectional depiction of the barrier part (233), and FIG. 5C is a cross sectional depiction of the drain tap part (23), in the self-rising mode.

When the water filter (1) is in the working mode then the water flows through it and it is filtered through the mesh filter (4). When the user rotates the opening and closing knob (232) from the working mode to the self-rising mode, then the rod (231) rotates and change the opening and closing barrier (233) from the working mode (in which the water flows form the hollow cartridge core (3) through the water outlet passageway (33) and through the passageway (2331) of the opening and closing barrier (233) to the filter housing (2) and outside through the outlet port (222) to the destination) to the self-rinsing mode in which the opening and closing barrier (233) blocks the water outlet passageway (33) and by that forces the water to stream through the several spray pipes (34) as explained above. In the self-rinsing mode, air enters into the filter housing and enables an easy flow of the water from the inlet port (221) to the drain tap (23).

What is claimed is:

1. A water filter with self-rinsing capability that comprises filter housing and a hollow cartridge core:

wherein the filter housing includes a hollow housing, a top cover, and a drain tap; wherein the hollow housing has a top opening and a drain opening; wherein the top cover has an inlet port and an outlet port; wherein the drain tap includes a rod, an opening and closing knob that is connected to a first end of the rod, and an opening and closing barrier that is connected to a second end of the rod, said barrier has a passageway for water flow;

wherein the hollow cartridge core comprises a hollow tube with a water inlet opening and a water outlet passageway; wherein said hollow cartridge core further includes one or more spray pipes, that each of which includes a plurality of spray nozzles; wherein the hollow cartridge core is designed to enable water to flow from the hollow tube into the one or more spray pipes and then outside into the filter housing through the spray nozzles for rinsing a mesh filter; wherein the one or more spray pipes are substantially parallel to at least a part of the hollow tube; and wherein a mesh filter is in a form of a hollow cylinder and is designed to be worn on the at least a part of the hollow tube inside a gap between the at least a part of the hollow tube and the one or more spray pipes;

wherein the water filter is designed to be in a working mode and in a self-rinsing mode;

wherein when the water filter is in the working mode, water inside the water filter flows from the inlet port through the top cover and then through the water inlet opening into the hollow tube, and from the hollow tube through the water outlet passageway and through the passageway of the barrier into the gap and from the gap through the mesh filter into the hollow housing and outside through the outlet port, and wherein when the water filter is in the self-rinsing mode, water inside the water filter flows from the inlet port through the top cover and then through the water inlet opening into the hollow tube, and from the hollow tube into the one or more spray pipes and through the spray nozzles and from the spray nozzles through the mesh filter into the gap and outside through the drain opening and the drain tap.

2. The water filter of claim 1 wherein said top cover further includes a one-way pressure valve that is designed to disable air to enter into the water filter when in said working mode and to enable air to enter into the water filter when in said self-rising mode for enabling the water to flow from said inlet port to said drain tap.

3. A hollow cartridge core that comprises a hollow tube with a water inlet opening and a water outlet passageway, and one or more spray pipes that each of which includes a plurality of spray nozzles;

wherein the one or more spray pipes are substantially parallel to at least a part of the hollow tube;

wherein the hollow cartridge core is designed to correspond with a filter housing of a water filter; wherein the filter housing includes a hollow housing, a top cover, and a drain tap; wherein the hollow housing has a top opening and a drain opening; wherein the top cover has an inlet port and an outlet port; wherein the drain tap includes a rod, an opening and closing knob that is connected to a first end of the rod, and an opening and closing barrier that is connected to a second end of the rod, said barrier has a passageway for water flow;

wherein a mesh filter in a form of a hollow cylinder can be worn on the at least a part of the hollow tube inside a gap between the at least a part of the hollow tube and the one or more spray pipes; and wherein the hollow cartridge core is designed to enable water to flow from the hollow tube into the one or more spray pipes and then outside into the filter housing through the plurality of spray nozzles for rinsing the mesh filter;

wherein the water filter is designed to be in a working mode and in a self-rinsing mode;

wherein when the water filter is in the working mode, water inside the water filter flows from the inlet port through the top cover and then through the water inlet opening into the hollow tube, and from the hollow tube through the water outlet passageway and through the passageway of the barrier into the gap and from the gap through the mesh filter into the hollow housing and outside through the outlet port; and wherein when the water filter is in the self-rinsing mode, water inside the water filter flows from the inlet port through the top cover and then through the water inlet opening into the hollow tube, and from the hollow tube into the one or more spray pipes and through the spray nozzles and from the spray nozzles through the mesh filter into the gap and outside through the drain opening and the drain tap.

4. The hollow cartridge core of claim 3 wherein said top cover further includes a one-way pressure valve that is designed to disable air to enter into said water filter when in said working mode and to enable air to enter into the water filter when in said self-rising mode for enabling the water to flow from said inlet port to said drain tap.

5. A filter housing of a water filter that comprises a hollow housing, a top cover, and a drain tap; wherein the hollow housing has a top opening and a drain opening; wherein the top cover has an inlet port and an outlet port; wherein the drain tap includes a rod, an opening and closing knob that is connected to a first end of the rod, and an opening and closing barrier that is connected to a second end of the rod, wherein said barrier has a passageway for water flow;

wherein the filter housing is designed to correspond with a hollow cartridge core;

wherein the hollow cartridge core comprises a hollow tube with a water inlet opening and a water outlet passageway; wherein said hollow cartridge core further includes one or more spray pipes, that each of which includes plurality of spray nozzles; wherein the hollow cartridge core is designed to enable water to flows from the hollow tube into the one or more spray pipes and outside into the filter housing through the plurality of spray nozzles for rinsing a mesh filter; wherein the one or more spray pipes are substantially parallel to at least a part of the hollow tube; and wherein the mesh filter can be in a form of a hollow cylinder that is designed to be worn on the at least a part of the hollow tube inside a gap between the at least a part of the hollow tube and the one or more spray pipes;

wherein the water filter is designed to be in a working mode and in a self-rinsing mode;

wherein when the water filter is in the working mode, water inside the water filter flows from the inlet port through the top cover and then through the water inlet opening into the hollow tube, and from the follow tube through the water outlet passageway and through the passageway of the barrier into the gap and from the gap through the mesh filter into the hollow housing and outside through the outlet port; and wherein when the water filter is in the self-rinsing mode, water inside the water filter flows from the inlet port through the top cover and then through the water inlet opening into the hollow tube, and from the hollow tube into the one or more spray pipes and through the spray nozzles and from the spray nozzles through the mesh filter into the gap and outside through the drain opening and the drain tap.

6. The filter housing of claim 5 wherein said top cover further includes a one-way pressure valve that is designed to disable air to enter into said water filter when in said working mode and to enable air to enter into the water filter when in said self-rising mode for enabling the water to flow from said inlet port to said drain tap.

* * * * *